United States Patent [19]

Annala

[11] Patent Number: 4,800,540

[45] Date of Patent: Jan. 24, 1989

[54] DISCRIMINATING ULTRASONIC PROXIMITY DETECTION SYSTEM

[75] Inventor: Wayne C. Annala, Durango, Colo.

[73] Assignee: The United States of America as represented by the United States Department of Energy, Washington, D.C.

[21] Appl. No.: 937,781

[22] Filed: Dec. 4, 1986

[51] Int. Cl.⁴ .............................................. G01S 9/66
[52] U.S. Cl. ........................................ 367/87; 367/93
[58] Field of Search ................... 367/136, 135, 93, 98, 367/87, 124; 340/565, 566, 552; 342/159–162, 27

[56] References Cited

U.S. PATENT DOCUMENTS

| 4,488,154 | 12/1984 | Ward | 342/162 |
| 4,512,000 | 4/1985 | Masuko | 367/93 |
| 4,622,555 | 11/1986 | Doggett et al. | 342/159 |
| 4,636,793 | 1/1987 | D'Addio et al. | 342/162 |

Primary Examiner—Thomas H. Tarcza
Assistant Examiner—Daniel T. Pihulic
Attorney, Agent, or Firm—Michael B. Lee; Clifton E. Clouse, Jr.; Judson R. Hightower

[57] ABSTRACT

This invention uses an ultrasonic transmitter and receiver and a microprocessor to detect the presence of an object. In the reset mode the invention uses a plurality of echoes from each ultrasonic burst to create a reference table of the echo-burst-signature of the empty monitored environment. The invention then processes the reference table so that it only uses the most reliable data. In the detection mode the invention compares the echo-burst-signature of the present environment with the reference table, detecting an object if there is a consistent difference between the echo-burst-signature of the empty monitored environment recorded in the reference table and the echo-burst-signature of the present environment.

20 Claims, 2 Drawing Sheets

DISCRIMINATING ULTRASONIC PROXIMITY DETECTION SYSTEM

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

This invention relates to the use of an ultrasonic transmitter and receiver and a microprocessor to accurately detect the presence of an object. There are many ultrasonic devices that are able to determine the presence or distance of an object. One such device transmits an ultrasonic burst and at the same time sets a latch signal. When the first echo is received by the receiver the latch signal is reset. The duration of the latch signal is proportional to the distance between the device and the target that caused the echo. Any echo received after the first echo and before the transmission of another tone burst has no effect.

The problem with this approach is that transient background noise may be picked up by the receiver and registered as an echo, causing this device to be unreliable. In addition, when used as a detector, the background environment may have characteristics that are continuously changing which affect the echo, causing the device to be unreliable. Another problem with this approach is that if the target object absorbs the transmitted frequency the device will fail to detect the target.

Another device used for this purpose emits bursts of ultrasound that are composed of different frequencies. The frequencies are chosen so that if the target absorbs one of the transmitted frequencies it will not absorb all of the other frequencies. Like the above device, the secondary echoes being received after the first echo following a transmitted burst has been received, have no effect. A problem with this device is that the receiver must have a broader bandwidth in order to receive all of the transmitted frequencies. The reception of a broader spectrum of frequencies results in the receiver picking up more background noise, making the device more easily affected by background noise.

Another problem with the above mentioned devices is that in an environment with complex shapes, these detectors will only detect the part of the environment that produces the first echo since they use only the first echo received following a transmitted burst, ignoring any secondary echoes. If an object is placed in a position in the environment so that it would not generate the first echo it would not be detected.

Many detectors have a narrow detection angle which simplifies the background environment.

SUMMARY OF THE INVENTION

An object of the invention is to provide a reliable ultrasonic detector, which can operate in an environment with transient background noise and with fluctuating echo characteristics.

Another object of the invention is to provide an ultrasonic detector that only needs one frequency, even though the target may totally absorb that frequency.

Another object of the invention is to provide a detection device that may detect objects in a complex environment while allowing the use of wide detection angles.

In carrying out the foregoing, a microprocessor, an ultrasonic transmitter and an ultrasonic receiver are used. Upon reset the microprocessor causes the transmitter to transmit periodic bursts of ultrasound. The microprocessor also divides the time following each burst into sample time points when the receiver is sampled for the presence of an echo from the transmitted burst. The echo signals from several transmitted bursts are sampled to create a reference table which describes the Burst-Echo-Signature of the environment that is devoid of the object or objects to be detected. A Burst-Echo-Signature is the time dependent echo pattern of the environment, measured at the sample time points, resulting from a transmitted burst of ultrasound. The structure of the reference table is such that each location in the table corresponds to one of the sample time points. When all of the echo signals have been sampled, each location in the reference table contains a table entry ("value") corresponding to the number of times that an echo was detected at its corresponding sample time point while the table was being created.

One method of creating the reference table is by first initializing the values to initial numbers. Each time an echo is detected at a sample time point the value at the location corresponding to the sample time point is incremented. In the specification and claims "to increment" means to adjust a value so that the value goes from its initial number to its final number if it is only incremented a specified number of times. This could mean increasing or decreasing the value by addition, subtraction, multiplication, division, or any other operation.

A sample time point that corresponds to a value indicating that the number of echos detected at the sample time point equals the number of bursts that were transmitted during the creation of the table is a sample time point that always (or consistently) yields an echo-detected condition (given that the environmental conditions are the same as they were at the time that the reference table was being created). A sample time point that corresponds to a value that indicates that no echos were detected at that sample time point, is a sample time point that never yields (or consistently does not yield) an echo-detected condition (given that the environmental conditions are the same as they were at the time that the reference table was being created). Other sample time points are sample time points that did not consistently yield either an echo-detected condition or a no-echo-detected condition, while the reference table was being created; in one embodiment these locations are considered unreliable and defined as locations with an unreliable-echo-detected condition. Another embodiment is implemented by setting the microprocessor so that during the reset cycle, locations that yiel an echo-detected condition more often than a predetermined number of times are considered locations that are reliable and consistently yield an echo-detected condition, and that locations that yield an echo-detected condition less than a second predetermined number of times are considered locations that are reliable and consistently yield a no-echo-detected condition, and the locations that yield an echo-detected condition equal to or between the first and second predetermined numbers of times are considered unreliable and inconsistently yield an echo-detected condition which is called an unreliable-echo-detected condition. The reference table is then further processed by flagging a set number of locations in the reference table immediately preceding and following a transition from one echo-detected condition to another echo-detected condition. The six possible transitions from one type of echo-detected condition to another echo-detected condition are as follows:

(1) When a location corresponding to a sample time point that consistently yields an echo-detected condition is followed by a location that corresponds to a sample time point that consistently yields a no-echo-detected condition.

(2) When a location corresponding to a sample time point that consistently yields an echo-detected condition is followed by a location that corresponds to a sample time point that yields an unreliable-echo-detected condition.

(3) When a location corresponding to a sample time point that consistently yields a no-echo-detected condition is followed by a location that corresponds to a sample time point that consistently yields an echo-detected condition.

(4) When a location corresponding to a sample time point that consistently yields a no-echo-detected condition is followed by a location that corresponds to a sample time point that consistently yields an echode-tected condition.

(5) When a location corresponding to a sample time point that yields an unreliable-echo-detected condition is followed by a location that corresponds to a sample time point that consistently yields an echo-detected condition.

(6) When a location corresponding to a sample time point that yields an unreliable-echo-detected condition is followed by a location that corresponds to a sample time point that consistently yields a no-echo-detected condition.

Having created a reference table and having flagged locations in the reference table immediately preceding or following transitions in the echo detected condition, the microprocessor shifts to the detection mode.

In the detection mode the microprocessor continues to cause the transmitter to emit periodic bursts of ultrasound and divides the time between the bursts into time sample points to measure the Burst-Echo-Signature as it did during the reset cycle. The sample time points of the Burst-Echo-Signature of the present environment are compared to their corresponding sample time points in the reference table. Sample time points, whose corresponding locations in the reference table are unreliable or have been flagged, are ignored. Since some of the sample points of the present environment, with an object present, would consistently differ from their corresponding, reliable and unflagged, sample points in the reference table, the presence of the object can be detected when any sample pint is found to consistently differ from its corresponding sample point in the reference table.

An example of one method of determining whether the Burst-Echo-Signature of the present environment consistently differs from the reference table uses a comparison table which numerically describes the consistency with which each of the sample points of the present Burst-Echo-Signature differs from their corresponding sample points in the reference table. This could be accomplished by creating the comparison table with values at locations which correspond to the sample time points. These values are first initialized to initial numbers. For each location in the comparison table, the corresponding location in the reference table is compared to the corresponding sample time point of the present environment. If an echo is detected at the sample time point of the present environment and the value in the corresponding location in the reference table is unflagged and indicates that an echo is consistently not detected the value in the comparison table would be incremented. In the specification and claims "to increment" means to adjust a value so that the value goes from its initial number to its final number if it is only incremented in a specified number of times. This could mean increasing or decreasing the value by addition, subtraction, multiplication, division, or any other operation. Similarly if an echo is not detected at the sample time point of the present environment and the value in the corresponding location in the reference table is unflagged and indicates that an echo is consistently detected the value in the comparison table is incremented. If the value reaches its final number, which is a predetermined number, then a detection signal is sent. If an echo is detected at the sample time point of the present environment and the value in the corresponding location in the reference table is unflagged and indicates that an echo is consistently detected and if the corresponding value in the comparing table is not equal to its initial number, the value in the comparison table would be decremented. In the specification and claims 37 to decrement" means to adjust a value so that the value goes from its final number to its initial number if it is only decremented in a specified number of times by an operation which is the inverse of the incrementing. This could mean increasing or decreasing the value by addition, subtraction, multiplication, division, or any other operation. Similarly if an echo is not detected at the sample time point of the present environment and the value in the corresponding location in the reference table is unflagged and indicates that an echo is consistently not detected and if the corresponding value in the comparing table is not equal to its initial number, the value in the table is decremented. In all other cases the values in the comparison table are not changed.

Because transient background noise does not consistently differ from its corresponding sample point in the reference table, transient background noise will usually be screened out.

Fluctuating environmental conditions, such as temperature and humidity, in the reference environment will result in a changing echo-detected condition at sample time points that were near a transition in the echo-detected condition when the reference table was being created. But since the reference table was further processed by flagging the locations in the reference table immediately preceding and following a transition in the echo-detected condition, changes in the echo-detected condition due to environmental conditions are ignored. The number of locations immediately preceding and following a transition in the echo-detected condition that must be flagged depends on the severity of the environmental fluctuations and the rate that the receiver is sampled for any particular application.

The invention is able to detect objects in a complex environment because the invention uses more than the first echo received. This allows the invention to be more accurate at wide detection angles.

DETAILED DESCRIPTION OF THE PREFERRED EMBODIMENT

Although the invention can be used for many applications, the following description will be for an embodiment of the invention that is used to detect the presence of a person in a CAIN Booth.

Figure 1:
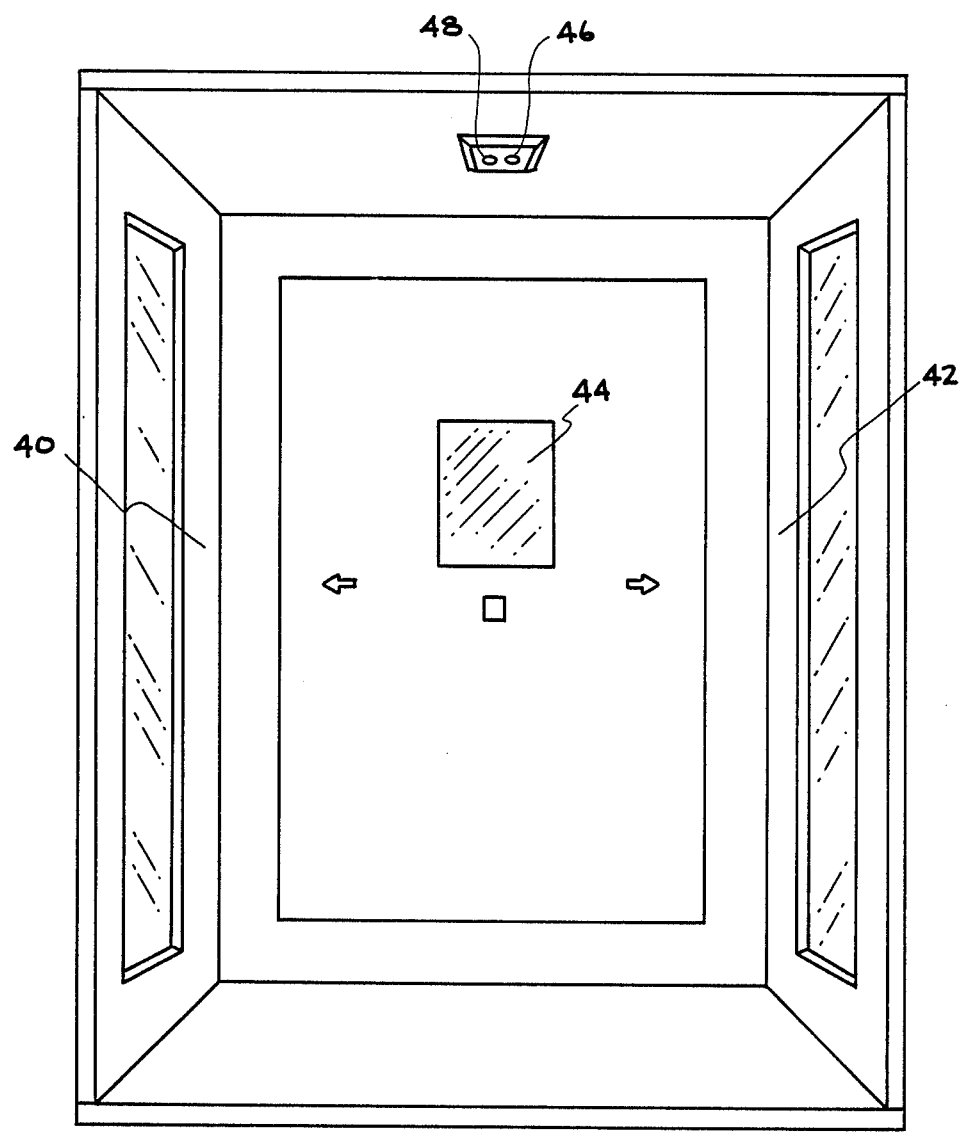
FIG. 1 is a perspective drawing of a CAIN booth with one wall removed.

A CAIN Booth, which is shown in FIG. 1, is used to control the access of personnel to secured areas. A person entering the secured area must enter the CAIN Booth through the A-door 40 (low security door) and when inside the CAIN Booth allow the A-door 40 to close and lock. At this point the invention must detect the person's presence in the booth and send a detection signal ("Occupied") to the CAIN Booth electronics. The Occupied signal causes the CAIN Booth electronics to keep the B-door 42 (high security door) of the CAIN Booth closed and locked so that someone inside lhe $eCured area would not be able to open the B-door 42 and allow the person inside the booth access to the secured area. The determination of whether the booth is occupied is important, since when the booth is empty a person in the secured area should be able to open B-door 42 to exit from the secured area; but when the booth is occupied it should not be possible to open B-door from the secured area. Otherwise a person in the secured area could allow a person in the booth without proper access into the secured area. The Occupied signal also causes the CAIN Booth electronics to signal security personnel that someone is in the booth so that they can verify via a television camera behind window 44 that the person has access to the area and unlock the B-door 42 allowing the person access to the area.

Figure 2:
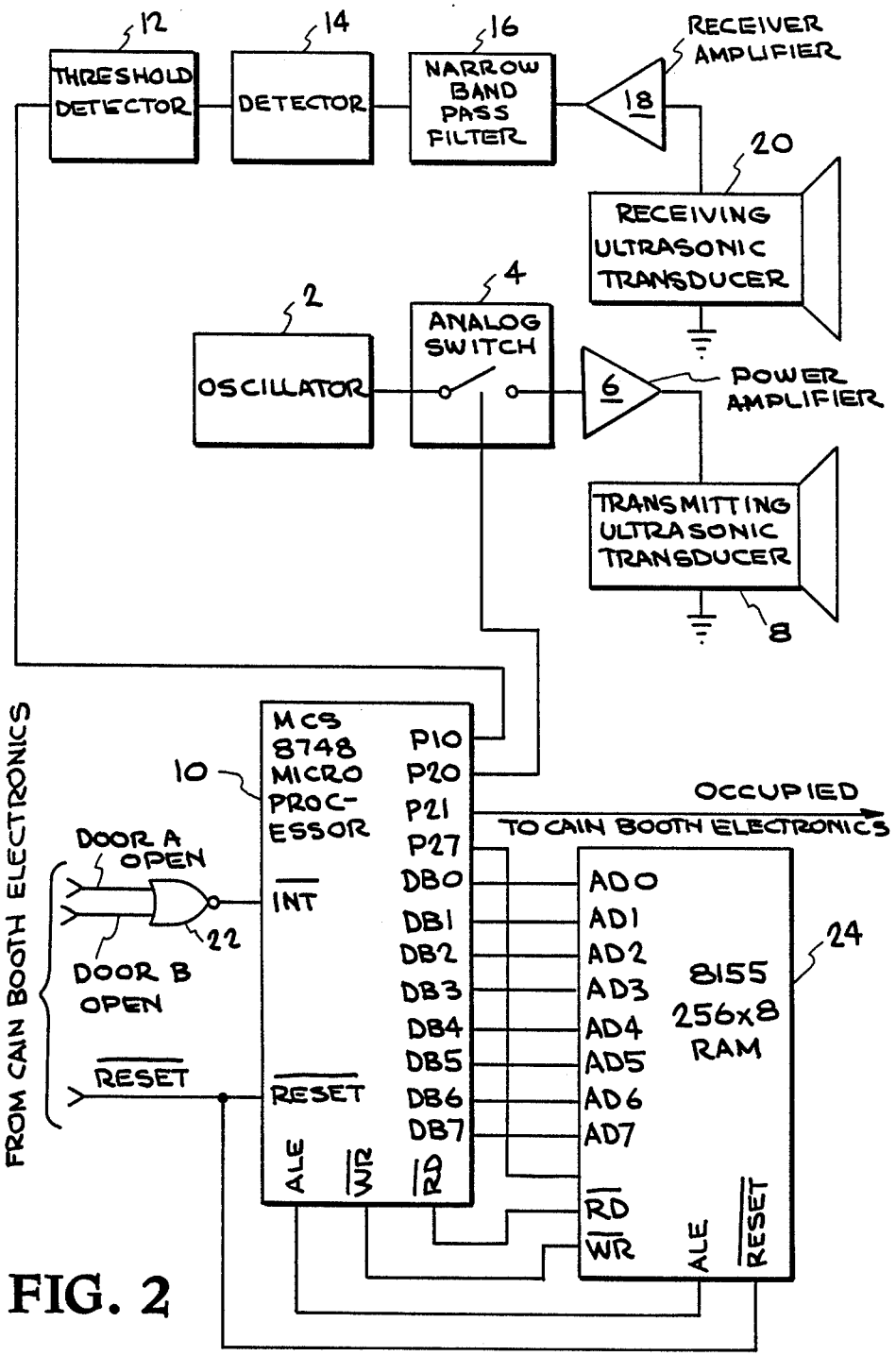
FIG. 2 shows a block diagram of one embodiment of the invention.

FIG. 2 shows a block diagram of a preferred embodiment. An oscillator 2 is connected to the input of an analog switch 4. The output of switch 4 is connected to a power amplifier 6 and switch 4 is controlled by bit 0 of Port 2 (P20) of the microprocessor 10. The output of the power amplifier 6 is connected to a transmitting ultrasonic transducer 8. A receiving ultrasonic transducer 20 feeds the input of a receiver amplifier 18. The output of the receiver amplifier 18 feeds the input of a narrow bandpass filter 16. The output of the narrow bandpass filter 16 feeds the input of a detector 14. The output of the detector 14 feeds a threshold detector 12. The output of the threshold detector 12 is sampled by the microprocessor 10 through bit 0 of Port 1 (P10) of the microprocessor 10. A NOR gate 22 gates the Negative Or of the Door A Open and the Door B Open signals, that are generated by the CAIN Bootn electronics, onto the Interrupt input of the microprocessor 10. The Reset-Not signal that is generated by the CAIN Booth electronics is connected to the Reset-Not pins of the microprocessor 10 and a 8155 256×8 RAM 24. The microprocessor 10 is connected to the 256×8 Ram 24. When the microprocessor sets the Occupied signal, bit 1 of Port 2 (P21) of the microprocessor 10 is used to send the Occupied signal to the CAIN Booth electronics.

Oscillator 2 generates a signal with the same frequency as the desired ultrasonic sound. The analog switch 4 is used to control the gating of the oscillator signal on and off of the input of the power amplifier 6. Bit 0 of Port 2 (P20) of the microprocessor 10 is used to control the analog switch 4. The microprocessor closes switch 4 for 0.667 milliseconds every 17.829 milliseconds. When switch 4 is closed the signal generated by the oscillator 2 is gated through the analog switch 4 onto the input of the power amplifier 6 where the signal is amplified. The amplified signal is sent to the transmitting ultrasonic transducer 8 which creates a burst of ultrasound with the same frequency as the signal. The burst of ultrasound has a duration of 0.667 milliseconds corresponding to the duration of the closure of the analog switch 4.

The receiving ultrasonic transducer 20 picks up the echoes from the burst and transduces them into electrical signals. The electrical signals are amplified by the receiver amplifier 18. The amplified echo signals are then passed through a narrow band pass filter 16 which filters out all electrical signals that do not have the same frequency as the transmitted burst of ultrasound. This removes most of the background noise which is not an echo of the ultrasonic burst. The detector 14 converts the filtered signal into a voltage potential. The more intense the echo signal the higher the voltage output. The threshold detector 12 converts the detected echo signals into a digital echo detected signal. Signals from the detector 14 that are higher than a set threshold level cause the threshold detector 12 to send the microprocessor 10 a digital high level voltage signifying an echo-detected condition. Signals from the detector 14 that are below that set threshold level cause the threshold detector 12 to send the microprocessor a digital low level voltage signifying a no-echo-detected condition.

The invention enters a reset cycle when low going pulse on the Reset-Not signal, from the CAIN Booth electronics, is applied to the microprocessor and the 256×8 RAM. Upon entering the reset cycle the microprocessor initializes all memory locations in the 256×8 RAM to their initial numbers, which in tnis part of the embodiment are all zero, in preparation for the creation of a reference table that will describe the Burst-Echo-Signature of the empty CAIN Bootn and the subsequent creation of a comparison table. Having initialized the memory, the microprocessor enables the interrupts; if any doors of the CAIN Booth are opened, during the reset cycle, the performance of the reset cycle will be suspended until all of the doors are once again closed, whereupon the microprocessor will again initialize the memory and begin the reset cycle again. This insures that the reference table that is created during the reset cycle will describe the Burst-Echo-Signature for the empty booth with all doors closed. After the memory has been initialized and all doors of the booth are closed the invention creates a reference table. During the creation of the reference table the invention transmits sound bursts and receives echos from the sound bursts as described above. The microprocessor divides the time following a transmitted burst to the beginning of the next transmitted burst into 127 evenly spaced sample time points that correspond to 127 memory locations (locations 1 through 127) in the 256×8 RAM. In this embodiment the microprocessor uses 100 echo signals from 100 bursts to generate the reference table. During the generation of the reference table, for each of the 127 sample time points, if an echo-detected condition is sent from the threshold detector to the microprocessor at a sample time point, the value of the corresponding memory location is incremented. In this part of the embodiment the value is incremented by adding one. After the 100 bursts, each of the 127 locations contains the number of times that the microprocessor found an echo-detected condition at its corresponding sample time point. At this point all locations having a value of zero or a value of 100, which is the final number for all values in this part of the embodiment, are considered as having reliable corresponding sample time points, as they respectively consistently yield either a no-echo-detected or an echo-detected condition. All other locations in the reference table are considered as having an unreliable-echo-detected condition. Having generated the reference table, the microprocessor further processes the reference table by flagging the locations in the reference table that immediately precede and the locations that immediately follow a transition from one echo detected condition to a different echo-detected condition, by setting them to a value of one. The six possible transitions from one type of echo-detected condition to another echo-detected condition are as follows:

(1) When a location corresponding to a sample time point that consistently yields an echo-detected condition is followed by a location that corresponds to a sample time point that consistently yields a no-echo-detected condition.

(2) Wnen a location corresponding to a sample time point that consistently yields an echo-detected condition is followed by a location that corresponds to a sample time point that yields an unreliable-echo-detected condition.

(3) When a location corresponding to a sample time point that consistently yields a no-echo-detected condition is followed by a location that corresponds to a sample time point that consistently yields an echo-detected condition.

(4) When a location corresponding to a sample time point that consistently yields a no-echo-detected condition is followed by a location that corresponds to a sample time o point that yields an unreliable-echo-detected condition.

(5) When a location corresponding to a sample time point that yields an unreliable-echo-detected condition is followed by a location that corresponds to a sample time point that consistently yields an echo-detected condition.

(6) When a location corresponding to a sample time point that yields an unreliable-echo-detected condition is followed by a location that corresponds to a sample time point that consistently yields a no-echo-detected condition.

An example of the way the reference table is further processed is the following: If location 40 and 41 contained values of zero (a consistent no-echo-detected condition was received while the reference table was being created), and if locations 42 and 43 contained a value of 100 (an echo-detected condition was consistently received the reference table was being created), before the table is further processed, the locations that would be flagged by further processing would be 41 and 42; the values in locations 40 and 43 would not be affected by the further processing as only one location immediately preceding and following a transition is flagged in this embodiment. This further processing is performed to make the device less sensitive to fluctuations in the temperature and humidity in the environment, thus increasing the device's reliability.

Other embodiments may use more or less than 127 sample time points and more or less than 100 Burst-Echo signals to create the reference table. Other embodiments may also flag more than one location in the reference table on either side of a transition from one type of echo-detected condition to another type of echo-detected condition to allow operation in environments that have more severe fluctuations in temperature and/or humidity. Once the reference table has been generated and processed, the invention shifts into the detection mode.

In the detection mode the microprocessor continues to cause the invention to transmit ultrasonic bursts and receive echos from the bursts as described above. Again, the microprocessor divides the time following a burst to the beginning of the next burst into 127 evenly spaced sample time points that correspond to the 127 locations in the reference table. In this mode the results of the samples are compared with their corresponding values in the reference table to create a comparison table of 127 memory locations (locations 128 through 255) in the 256×8 RAM that also correspond to each of the 127 sample points. The values at each of the 127 locations in the comparison table were initialized to their initial numbers, which in this part of the embodiment are all zeros at the beginning of the reset cycle prior to shifting to the detection mode, as was described above. All sample time points that have corresponding locations in the reference table that have a value of zero at the end of the reset cycle, are considered as reliable sample time points, as they consistently yielded a no-echo-detected condition in the empty booth environment. All sample time points that have corresponding locations in the reference table that have a value of 100 at the end of the reset cycle, are also considered as reliable sample time points, as they consistently yielded an echo-detected condition in the empty booth environment. All other sample time points are considered unreliable and are not used in the generation of the comparison table. As the microprocessor samples the output of the threshold detector for the presence of an echo, if the threshold detector signals an echo-detected condition, one of five actions will be taken. Which one of the five possible actions is taken depends on the values held in the locations in the reference table and the comparison table that correspond to that sample time point. The five possible actions for a sample time point that yields an echo detected condition and the values in the reference and comparison table that cause them to be taken are as follows:

(1) If the value in the reference table that corresponds to this sample time point is greater than zero and less than 100 (corresponding to a sample time point that is either unreliable or has been flagged by the further processing of the reference table), no action is taken.

(2) If the value in the reference table that corresponds to this sample time point is zero and incrementing, which in this part of the embodiment is accomplished by adding one, the corresponding value in the comparison table does not cause that value to become equal to ten, which is the final number for the values in tnis part of the embodiment, the value in the comparison table is incremented by adding one.

(3) If the value in the reference table that corresponds to this sample time point is zero and incrementing the corresponding value in the comparison table causes that value to become equal to ten, which is the final number for all values in tnis part of the embodiment, the microprocessor sets the Occupied signal and shifts to the Occupied mode.

(4) If the value in the reference table that corresponds to this sample time point is 100 and the corresponding value in the comparison table is zero, no action is taken.

(5) If the value in the reference table that corresponds to this sample time point is 100 and the corresponding value in the comparison table is greater than zero, which is the initial number for the values in this part of the embodiment, the value in the comparison table is decremented, which in this part of the embodiment is accomplished by subtracting one.

If, however, the threshold detector signals a no-echo-detected condition there are also five possible actions, one of which will be taken. Which one of the five possible actions is taken, again, depends on the values held in the locations in the reference table and the comparison table that correspond to that sample time point. The five possible actions for a sample time point that yields a no-echo-detected condition and the values in the reference and comparison table that cause them to be z5 taken are as follows:

(1) If the value in the reference table that corresponds to this sample time point is greater than zero and less than 100 (corresponding to a sample time point that is unreliable or has been flagged by the further processing of the reference table), no action is taken.

(2) If the value in the reference table that corresponds to this sample time point is 100 and incrementing, which as mentioned before is accomplished in this part of this embodiment by adding one, the corresponding value in the comparison table does not cause that value to become equal to ten, which as mentioned before is the final number for the values in tnis part of the embodiment, the value in the comparison table is incremented by adding one to the value.

(3) If the value in the reference table that corresponds to this sample time point is 100 and adding one to the corresponding value in the comparison table causes that value to become equal to ten, which as mentioned before is the final number for the values in this part of the embodiment, the microprocessor sets the Occupied signal and shifts to the Occupied mode.

(4) If the value in the reference table that corresponds to tnis sample time point is zero and the corresponding value in the comparison table is zero, no action is taken.

(5) If the value in the reference table that corresponds to this sample time point is zero and the corresponding value in the comparison table is greater than zero, which as mentioned before is the initial number for the values in this part of the embodiment, the value in the comparison table is decremented, which as mentioned before is accomplished in this part of the embodiment by subtracting one.

Since random transient noise would tend to cause an echo to be detected at a particular sample time point on one Burst-Echo Signal but not on the next Burst-Echo Signal, an incrementation caused by the transient noise on one Burst-Echo-Signal tends to be decremented out the next time that sample time point is sampled. Other embodiments may establish a detection output when some value greater than ten is reached in the comparison table if more noise rejection is required, or less than ten if less noise rejection is required. With the apparatus in the detection mode, if any door is opened, the resulting interrupt causes the microprocessor to again initialize all locations in the comparison table to a value of zero and suspend the detection mode until all of the doors are closed before resuming the detection mode. This reinitialization of the comparison table when a door opens and delay to allow the door to close before resuming the active detection mode, insures that the environment described in the reference table is not changed, with the exception of the possible introduction of the object or objects whose presence the invention is attempting to detect.

In the Occupied mode the microprocessor continues to hold the Occupied signal high, discontinues the transmission of ultrasonic bursts and the receipt of echos of the ultrasonic bursts, and initializes the comparison table to zero. Having initialized the comparison table, the invention waits for a door to open. When a door is opened, the invention clears the Occupied signal and waits for the door to close. When the door closes the invention resumes the detection mode.

Because empty CAIN Booths have complex echo patterns, conventional ultrasonic detectors, which use only the first echo, might not detect the presence of a person if the person is in a position that does not affect the first echo or has a covering that absorbs the ultrasonic burst.

If the transmitter for a single echo detector is set at a wide angle, the first echo would come from the perpendicular walls, surfaces on window moldings, or the door handles. A person would only need to be farther away from the receiver and transmitter than the object (i.e., the part of the wall) that causes the first echo. This might be accomplished by lying on the floor.

If the transmitter for a single echo detector is set at a narrow angle so that the burst covers only part of the floor, a person standing on the part of the floor that is not covered by the burst would not be detected. A better device would allow the transmitted burst to have a beam angle that would allow the burst to reach the whole floor. A poorly designed system would only allow one part of the floor to generate the first echo, because one part of the floor would be closer to the transmitter and receiver than other parts of the floor. A person might be located on the part of the floor that does not create the first echo and have a covering that absorbs the ultrasonic sound, thus not affecting the time of the first echo and avoiding detection.

The invention uses the first and subsequent echoes; it is able to develop a detailed signature of a complex empty environment, in this case an empty booth. A device that uses only a change in the Burst-Echo-Signature to detect the presence of a person would be triggered by transient background noise or fluctuations in the empty booth. This invention filters out transient background noise by requiring a constant change in the Burst-Echo-Signature. A device that does not allow for changes in the Burst-Echo-Signature that are caused by fluctuations in the environment, such as temperature and humidity, would be triggered by these fluctuations. This invention screens out fluctuations in the environment by flagging data points that immediately precede or follow the transitions from one type of echo-detected condition to another type of echo detected condition in the reference table and ignoring their corresponding sample time points while creating the comparison table. Sample time points that yield an unreliable-echo-detected condition are also ignored, increasing the device's reliability.

Changes and modifications in the specifically described embodiments can be carried out without departing from the scope of the invention which is intended to be limited only by the scope of the appended claims.

We claim:

1. A method of detecting the presence of an object comprising:

setting up a reference table with values at locations describing a Burst-Echo-Signature of a burst of ultrasound transmitted into an environment without the object;

transmitting periodic bursts of ultrasound into the environment;

receiving a plurality of echoes from the environment for each transmitted burst of ultrasound; and comparing the echoes from a plurality of bursts of ultrasound with the reference table to determine if a Burst-Echo-Signature of the present environment consistently differs from the Burst-Echo-Signature of the environment without the object.

2. A method of detecting the presence of an object as recited in Cl TM aim 1, wherein the method of setting up the reference table, comprises the steps of:

transmitting a plurality of evenly spaced bursts into the environment without the object;

dividing the time between each consecutive burst into a plurality of sample time points;and incrementing the values at the locations if an echo is detected at the sample time point corresponding to the location.

3. A method of detecting the presence of an object as recited in claim 2, which further comprises:

determining locations with an unreliable-echo detected condition in the reference table; and ignoring the echoes from the present environment that correspond to locations with an unreliable-echo detected condition.

4. A method of detecting the presence of an object as recited in claim 3, further comprising the steps of:

flagging a set number of locations in the reference table which immediately precede or follow transitions in the echo-detected conditions of adjacent locations; and ignoring the echoes from the present environment that correspond to flagged locations in the reference table.

5. A method of detecting the presence of an object as recited in claim 4, wherein the step of comparing the echoes from the present environment with the reference table, comprises the steps of:

initializing values at locations in a comparison table, which have a one to one correspondence to the sample time points to predetermined initial numbers;

incrementing the value at a location in the comparison table, when the following conditions are met:

(1) the location in the reference table, corresponding to the present sample time point, is not unreliable and not flagged; and (2) the echo condition of the corresponding present sample time point is different from the echo condition at its corresponding location in the reference table;

decrementing a value, if it is not equal to its initial number, at a location in the comparison table , when the following conditions are met:

(1) the location in the reference table, corresponding to the present sample time point is not unreliable and not flagged; and (2) the echo condition of the corresponding present sample time point is the same as the echo condition at its corresponding location in the reference table; and establishing a detector output and resetting all values in the comparison table to their initial numbers if any value in the comparison table reaches its final number.

6. A method of detecting an object, as recited in claim 5, wherein the steps of transmitting periodic bursts of ultrasound and receiving a plurality of echoes comprise the steps of:

generating an electrical signal with the same frequency as the desired ultrasound;

creating bursts of the ultrasound by controlling the gating of the generated signal;

amplifying the gated signal;

transducing the amplified electrical signal into ultrasound;

transducing the echoes into an electrical signal of the same frequency as the echoes;

amplifying the electrical signal;

filtering out all electrical signals of frequencies that are not close to the frequency of the transmitted burst;

converting the filtered signal into a voltage that is proportional to the echo signal intensity;

detecting all voltages above a threshold to produce a digital echo detected signal; and directing the digital echo detected signal to the echo comparing means.

7. An apparatus for detecting the presence of an object in an environment, comprising:

a reference table having a set of locations for storing values;

means for recording a Burst-Echo-Signature of the environment without the object, on the reference table;

means for transmitting periodic bursts of ultrasound into the environment;

means for receiving a plurality of echoes from each transmitted burst of ultrasound; and means for comparing the echoes from a plurality of bursts of ultrasound with the reference table to see if the echoes are consistently different.

8. An apparatus for detecting the presence of an object, as recited in claim 7, wherein the means for recording the Burst-Echo-Signature of the environment on the reference table, comprises:

means for transmitting a plurality of evenly spaced bursts into the environment without the object;

means for dividing the time between each consecutive burst into a plurality of sample time points; and means for incrementing a value at a location in the reference table if an echo is detected at a sample time point corresponding to the location.

9. An apparatus for detecting the presence of an object as recited in claim 8, further comprising:

means for determining locations with values designating an unreliable-echo-detected condition; and means for ignoring the echoes from the present environment that correspond to locations of unreliable data in the reference table.

10. An apparatus for detecting the presence of an object, as recited in claim 9, further comprising means for flagging the locations in the reference table that immediately precede and immediately follow a transition in echo-detected conditions of adjacent locations; and means for ignoring the echoes from the present environment that correspond to flagged locations in the reference table.

11. An apparatus for detecting the presence of an object, as recited in claim 10, wherein the means for comparing the echoes with the reference table, comprises:
  a comparison table with values at locations having a one to one correspondence with the sample time points;
  means for initializing to initial numbers the values in the comparison table;
  means for incrementing the value at a location in the comparison table, when the following conditions are
    (1) the location in the reference table, corresponding to the present sample time point, is not unreliable and not flagged; and
    (2) the echo condition of the corresponding present sample time point is different from the echo condition at its corresponding location in the reference table;
  means for decrementing a value, if it is not equal to its initial number, at a location in the comparison table, when the following conditions are met:
    (1) the location in the reference table, corresponding to the present sample time point is not unreliable and not flagged; and
    (2) the echo condition of the corresponding present sample time point is the same as the echo condition at its corresponding location in the reference table; and
  means for establishing a detector output and resetting all values in the comparison table to their initial number if any value in the comparison table reaches its final number.

12. An apparatus for detecting an object, as recited in claim 11, wherein the means for transmitting periodic bursts of ultrasound into the environment and receiving a plurality of echoes, comprises:
  means for generating an electrical signal with the same frequency as the desired ultrasound;
  means for creating bursts of the ultrasound by controlling the the gating of the generated signal;
  means for amplifying the gated signal;
  means for transducing the amplified electrical signal into ultrasound;
  means for transducing the echoes into an electrical signal of the same frequency as the echoes;
  means for amplifying the electrical signal;
  means for filtering out all electrical signals of frequencies that are not close to the same frequency as the transmitted burst;
  means for converting the filtered signal into a voltage that is proportional to the echo signal intensity;
  means for detecting all voltages above a threshold to produce a digital echo detected signal; and
  means for directing the digital echo detected signal to the echo comparing means.

13. A method of detecting the presence of a person in a CAIN Booth, comprising of the steps of:
  setting up a reference table having a set of locations for storing values describing a Burst-Echo-Signature of a burst of ultrasound transmitted into the CAIN Booth without the person;
  transmitting periodic bursts of ultrasound into the CAIN Booth;
  receiving plurality echoes from each transmitted burst of ultrasound; and
  comparing the echoes from a plurality of bursts of ultrasound with the reference table to determine if a Burst-Echo-Signature of the present CAIN Bootn consistently differs from the Burst-Echo-Signature of the CAIN Booth without the person.

14. A method of detecting the presence of a person in a CAIN Booth, as recited in claim 13, further comprising the steps of:
  determining locations with values designating an unreliable-echo-detected condition;
  ignoring the echoes from the present CAIN Booth that correspond to locations of unreliable data in the reference table.
  flagging locations in the reference table which immediately precede or follow transitions in echo-detected conditions of adjacent locations; and
  ignoring the echoes from the present CAIN Bootn that correspond to locations of flagged data in the reference table.

15. A method of detecting the presence of a person in a CAIN Bootn as recited in claim 14, wherein the step of comparing the echoes with the reference table, comprises the steps of:
  initializing values at locations in a comparison table, which have a one to one correspondence to the sample time points, to predetermined initial numbers;
  incrementing the value at a location in the comparison table, when the following conditions are met:
    (1) the location in the reference table, corresponding to the present sample time point, is not unreliable and is not flagged; and
    (2) the echo condition of the corresponding present sample time point is different from the echo condition at its corresponding location in the reference table;
  decrementing a value, if it is not equal to its initial number, at a location in the comparison table, when the following conditions are met:
    (1) the location in the reference table, corresponding to the present sample time point is not unreliable and is not flagged; and
    (2) the echo condition of the corresponding present sample time point is the same as the echo condition at its corresponding location in the reference table; and
  establishing a detector output and resetting all values in the comparison table to their initial values if any value in the comparison table reaches its final number.

16. A method of detecting a person in a CAIN Booth, as recited in claim 15, wherein the steps of transmitting periodic bursts of ultrasound and receiving a plurality of echoes comprise the steps of:
  generating an electrical signal with the same frequency as the desired ultrasound;
  creating bursts of the ultrasound by controlling the gating of the generated signal;
  amplifying the gated signal;
  transducing the amplified electrical signal into ultrasound;
  transducing the ecnoes into an electrical signal of the same frequency as the echoes;
  amplifying the electrical signal;
  filtering out all electrical signals of frequencies that are not close to the same frequency as the transmitted burst;
  converting the filtered signal into a voltage that is proportional to the echo signal intensity;
  detecting all voltages above a threshold to produce a digital echo detected signal; and directing the digital echo detected signal to the echo comparing means.

17. An apparatus for detecting the presence of a person in a CAIN Booth, comprising:
   a reference table with a set of locations for storing values;
   means for recording a Burst-Echo-Signature of a CAIN Booth without the person, on the reference table;
   means for transmitting periodic bursts of ultrasound into the CAIN Booth;
   means for receiving a plurality of echoes from each transmitted burst of ultrasound; and
   means for comparing the echoes from a plurality of bursts of ultrasound with the reference table to see if the echoes are consistently different.

18. An apparatus for detecting the presence of a person in a CAIN Booth as recited in claim 17, further comprising:
   means for determining locations with values designating an unreliable-echo-detected condition;
   means for ignoring the echoes from the present CAIN booth that correspond to locations of the unreliable data in the reference table;
   means for flagging data immediately preceding or following transitions in echo-detected conditions of adjacent locations; and
   means for ignoring echoes from the present CAIN Booth that correspond to locations of flagged data in the reference table.

19. An apparatus for detecting the presence of a person in a CAIN Booth, as recited in claim 18, wherein the means for comparing the echoes with the reference table, comprises:
   a comparison table with values at locations having a one to one correspondence with the sample time
   means for initializing all the values in the comparison table to their initial numbers;
   means for incrementing the value at a location in the comparison table, when the following conditions are
   (1) the location in the reference table, corresponding to the present sample time point, is not unreliable and is not flagged; and
   (2) the echo condition of the corresponding present sample time point is different from the echo condition at its corresponding location in the reference table;
   means for decrementing a value, if it is not equal to its initial number, at a location in the comparison table, when the following three conditions are met:
   (1) the location in the reference table, corresponding to the present sample time point is not unreliable and is not flagged; and
   (2) the echo condition of the corresponding present sample time point is the same as the echo condition at its corresponding location in the reference table; and
   means for establishing a detector output and resetting all values in the comparison table to their initial values if any value in the comparison table reaches its final number.

20. An apparatus for detecting a person in a CAIN Booth, as recited in claim 19, wherein the means for transmitting periodic bursts of ultrasound into the CAIN Booth and receiving a plurality of ecnoes, comprises:
   means for generating an electrical signal with the same frequency as the desired ultrasound;
   means for creating bursts of the ultrasound by controlling the the gating of the generated signal;
   means for amplifying the gated signal;
   means for transducing the amplified electrical signal into ultrasound;
   means for transducing the echoes into an electrical signal of the same frequency as the echoes;
   means for amplifying the electrical signal;
   means for filtering out all electrical signals of frequencies that are not close to the same frequency as the transmitted burst;
   means for converting the filtered signal into a voltage that is proportional to the echo signal intensity;
   means for detecting all voltages above a threshold to produce a digital echo detected signal; and
   means for directing the digital echo detected signal to the echo comparing means.

* * * * *